United States Patent
McBurnett

[15] 3,644,915
[45] Feb. 22, 1972

[54] FILTER BYPASS INDICATOR

[72] Inventor: James R. McBurnett, Stillwater, Okla.

[73] Assignee: Allis-Chalmers Manufacturing Company, Milwaukee, Wis.

[22] Filed: Aug. 27, 1969

[21] Appl. No.: 853,463

[52] U.S. Cl. .......................... 340/239 F, 200/81.9, 210/90
[51] Int. Cl. .................................................. G08b 21/00
[58] Field of Search ............... 340/239 F, 238, 237, 220, 243, 340/248; 200/81.9; 210/90

[56] References Cited

UNITED STATES PATENTS 2,810,034  10/1957  Grant ........................... 340/239 F X
2,826,754  3/1958   Carignan ....................... 200/81.9 X
912,432    2/1909   Spamer .......................... 340/238
2,328,131  8/1943   Eisler ......................... 340/239 F X
2,879,892  3/1959   Frakes ......................... 340/239 F X
3,304,381  2/1967   McAnespey .................. 340/248 R UX Primary Examiner—Thomas B. Habecker
Assistant Examiner—Daniel Myer
Attorney—Arthur L. Nelson, Kenneth C. McKivett and Robert B. Benson

[57] ABSTRACT

An oil filter bypass indicator in which the bypass valve is used as a switch to open and close an electrical circuit. The indicator may be a light bulb, a buzzer, or any suitable means to indicate the filter is not filtering and the oil is being bypassed around the filter through the bypass valve.

6 Claims, 3 Drawing Figures

Patented Feb. 22, 1972

3,644,915

Inventor
James P. McBurnett 3,644,915

FILTER BYPASS INDICATOR

This invention relates to a filter and more particularly to an electrical circuit using the bypass valve as a switch in the electrical circuit to activate a signal indicating a defective filter and that the bypass valve is open permitting the flow of fluid around the filter.

Filtering elements are used in various types of hydraulic systems to filter foreign material from the fluid circulated throughout the system. They are particularly useful in lubricating oil systems where the foreign material may cause failure in lubrication of bearings and various other parts in the vehicle. Accordingly filters are used to remove the foreign material from the fluid system and to assure circulation of the fluid through the system. In event that the filtering element becomes contaminated a bypass valve is positioned in parallel with the filtering element. Accordingly when the filtering element is contaminated or clogged the bypass valve opens in response to an increase in pressure on the high-pressure side of the filter element. Once the bypass valve is opened, the fluid is no longer filtered. The failure of the filtering element is not known to the operator and accordingly the purpose of the element is defeated if the defective condition is continued. Accordingly an alarm or indicator used in the system will provide this information to the operator of the motor vehicle. Accordingly the filter can then be replaced and the bypass valve will close and filtering will function normally.

Accordingly this invention is intended to provide such an alarm to indicate to the operator that the filtering element is defective. The system proposed is a foolproof means of providing an indication to the operator when the defective filter element is producing a bypass of the hydraulic fluid around the filter. The bypass valve is used as a switch in an electrical circuit which opens and closes in response to the defective condition of the filter element.

It is an object of this invention to provide a filter bypass indicator indicating when the filtering element is defective.

It is another object of this invention to provide an electrical circuit using the bypass valve as a switch element to activate the alarm or indicator.

It is a further object of this invention to provide an electrical circuit in a fluid-filtering system wherein the bypass valve bypassing the filter element operates as a switch in the electrical system having an alarm indicating a defective filter.

It is a further object of this invention to provide a bypass filter indicator wherein the electrical circuit includes a bypass valve operating as a switch which opens to indicate when the filter is defective.

The objects of this invention are accomplished by providing a filter in a hydraulic system in which a bypass valve is positioned in parallel with the filtering portion of the hydraulic system. The bypass valve opens when the filtering element becomes contaminated and blocks the flow of hydraulic fluid through the filter. The bypass valve operates as an electrical switch in the electrical system which actuates the alarm. The bypass valve operates as the switch and a spring normally biases the valve to a closed position. When the bypass valve opens the switch is open and the alarm indicates the fact that the bypass valve is opened because of the defective filter.

Referring to the drawings.

Figure 1:
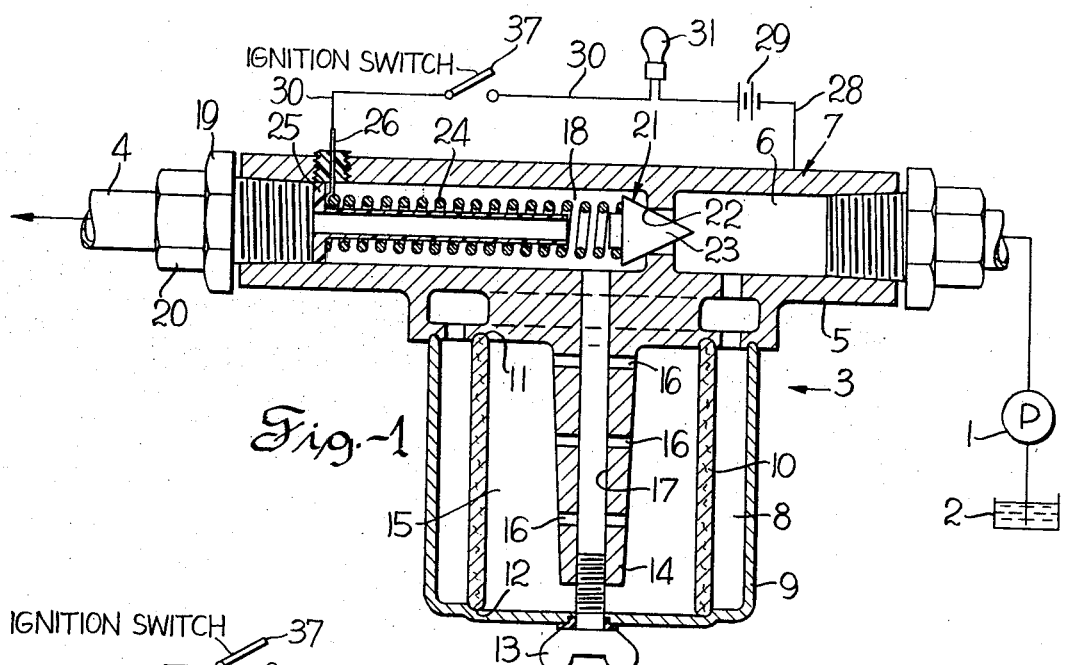
FIG. 1 illustrates a cross section view of the filter and the bypass valve with an electrical circuit.

Referring to FIG. 1 the hydraulic fluid pump 1 receives hydraulic fluid from the reservoir 2 and pumps the hydraulic fluid to the filter assembly 3. The hydraulic fluid passes through the filter assembly and out the other side through conduit 4 which may be connected to the vehicle engine or any other mechanism requiring filtered hydraulic fluid.

The conduit 5 supplies hydraulic fluid under pressure to the inlet passage 6 in the housing 7 of the filtering assembly 3. The fluid in chamber 6 is under pressure from the pump 1 and normally passes downwardly into the cavity 8 of the filter casing 9. The filter casing 9 encloses the filter element 10 and forms a seal 11 and 12 with the upper portions of the filtering element and housing 7 and also a seal between the lower portion of the filter and the casing 9. The wingnut 13 carries a studbolt which threadedly engages the stem 14 extending downwardly from the housing 7 of the filter assembly 3. The wingnut 13 can be unscrewed from the stem 14 on the housing 7 for replacement of the filtering element 10. The casing 9 and the filtering element 10 define the inlet cavity 8 on the external periphery of the element 10 and the outlet cavity concentrically within the element 10. A plurality of holes 16 extend radially into the axial passage 17 which is in communication with the outlet passage 18 in the housing 7. The outlet passage 18 extends into the fitting 19 connected to the conduit 4 by means of the nut 20. Normally the hydraulic fluid flows from the inlet passage 6 and the inlet cavity 8 through the outlet cavity 15 and the outlet passage 18 to the conduit 4 which provides filtering of the hydraulic fluid as it passes through the filter assembly 3. The bypass valve 21 is formed within the housing 7 which defines a bypass valve element 23 engaging the valve seat 22. The spring 24 is seated on an insulated base of sleeve 25 biasing the valve element 23 to engaging position with its mating valve seat 22. The terminal 26 is connected to the spring 24 which forms an electrical conductor from the terminal 26 to the valve element 23. The electrical current flows through the spring 24 and valve element 23 to the valve seat 22 of housing 7. The housing 7 is considered ground as it is connected to the chassis and the grounded side of the battery 29 through conductor 28. The battery 29 is connected on its high-potential side to the conductor 30 which is connected to terminal 26 through the bulb 31 and ignition switch 37. The circuit as shown in FIG. 1 will maintain the light lighted so long as the filter remains in a filtering position. A green light bulb may be chosen to indicate normal filtering and an on condition would assure the circuit is working. When the filter becomes defective because of being loaded with foreign material and fails to provide filtering, the bypass valve opens which in turn opens the circuit since the bypass valve operates as a switch.

Figure 2:
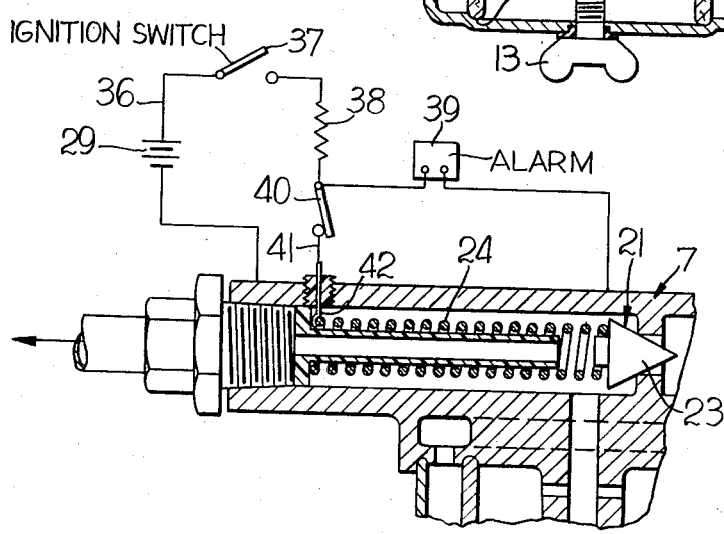
FIG. 2 illustrates a modification of the electrical circuit and the bypass valve operating as a switch.

Referring to FIG. 2, a modification of the electrical circuit is shown. The low side of the battery 29 is connected to the housing 7. The high side of the battery is connected to the conductor 36. The conductor 36 is connected through the ignition switch 37 to the resistor 38. The alarm 39, which may produce any suitable visual or audible signal, is connected between the resistor 38 and the housing 7. Connected in parallel with the alarm 39 is the test switch 40, conduit 41, terminal 42, spring 24, and valve element 23. The test switch 40 is normally closed and can be momentarily opened to test whether the alarm is operative.

Figure 3:
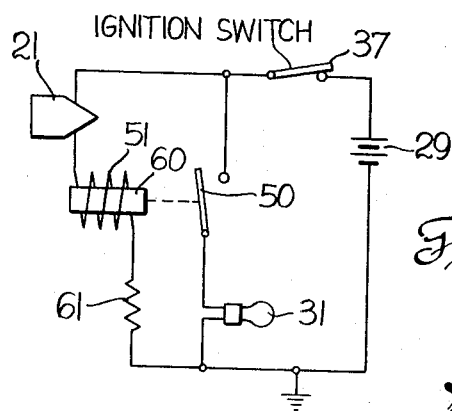
FIG. 3 is a modification of the electrical circuit.

Referring to FIG. 3 a modification of the electrical circuit is illustrated wherein the battery 29 is connected to an ignition switch 37. The ignition switch 37 connects bulb 31 through the relay switch 50 in series across the battery 29. Also connected through the ignition switch 37 is the relay coil and bypass filter switch 21 and resistor 61 which are also connected across the battery 29. The relay switch 50 is normally closed when ignition switch 37 is open and is opened when current flows through relay coil 51. Relay switch 50 operates as a test switch when ignition switch 37 is closed, since the inductance of coil 51 momentarily impedes the flow of current to place a voltage across bulb 31 sufficient to light it.

The preferred embodiments of this invention have been illustrated and described and the operation of the device will be set forth in the following paragraph.

Referring to FIG. 1 when the filter assembly 3 is operating in a normal manner, the pump 1 pressurizes fluid forcing it through the inlet passage 6 into the inlet cavity 8. The hydraulic fluid is then passed through the filter element 10 into the outlet cavity 15 and the outlet passage 18. During normal operations the bypass valve 21 is in the closed position. When the filter element 10 loses the filtering characteristics because it becomes loaded with foreign material, and accordingly will not transmit fluid through the filtering element the bypass valve 21 will open. When the bypass valve 21 opens, the electrical circuit is broken, and the light 31 will go out indicating to the operator that the bypass valve is opened and that the filter element is defective. Accordingly the operator will replace the filter element 10 to provide satisfactory filtering.

Referring to FIG. 2 the filtering arrangement operates in a similar manner as that described in FIG. 1. When the filter, however, fails to filter the hydraulic fluid and pressure builds up in the inlet passage 6, the bypass valve 21 opens thereby producing a voltage across the alarm 39 which in turn operates the alarm. The operation of the alarm provides an audible signal which will indicate to the operator that the filter is defective and accordingly must be changed. The test switch 40 provides a normally closed switch which can be momentarily opened to test the operativensss of the circuit and the alarm.

The circuit shown in FIG. 2 includes a battery 29 connected to the housing 7. The positive side of the battery is connected to an ignition switch 37 which in turn is connected to the resistor 38. The test switch 40 and bypass valve switch 21 are connected in series between the housing 7 and the resistor 38. The alarm 39 is connected in parallel with these two switches and has one end connected to the housing and the other connected to the resistor 38. When the ignition switch 37 is closed and the bypass valve 21 forming a switch is closed the circuit is in operation. The current passing through the resistor 38 is shunted to ground which is the housing 7. Consequently, the total voltage of the battery is produced across the resistor 38. The test switch 40 is normally biased to a closed position and can be momentarily opened to open the shunt portion of the circuit and cause the current to flow through the alarm creating a voltage across the alarm. This will cause the alarm to provide an audible or visual signal to the operator indicating it is operative.

Accordingly, if the bypass valve 21, forming a switch is opened in response to increased pressure in the inlet passage 6 the voltage will also be produced across the alarm which will activate the alarm. The circuit will operate only when the ignition switch is closed.

Referring to FIG, 3, a modification of the circuit is illustrated. A relay switch 50 and a bulb 31 are placed in series across the battery 29. The ignition switch 37 activates the circuit when the vehicle is in operation. In parallel with the relay switch 50 and the bulb 31 is a relay coil 51 and resistor 61. The relay coil 51 is energized only so long as the bypass valve 21 which operates as a switch is closed.

When the bypass valve is open the relay coil 51 is deenergized, the relay switch 50 automatically closes and the voltage of the battery 29 is applied across the bulb 31 thereby producing a visual signal to the operator.

It is also noted that when the ignition switch 37 is initially closed the inductive reactance of the relay coil 51 impedes the flow of current through the coil. This momentary impedance to the flow of current through the coil will produce a voltage across the bulb 31 sufficiently to cause the bulb to light indicating the operativensss of the circuit. The current flow builds up in the relay coil and a magnetic field produced in the core 60 opens the relay switch 50 which is normally closed. The circuit has a limited flow of current through the coil 51 and the resistor 61 when the vehicle is in operation as compared to that normally required in the circuit shown in FIG. 1.

In describing the invention, the preferred embodiment has been shown and described, but it is obvious to one skilled in the art that there are many variations, combinations, alternations and modifications that may be made without departing from the spirit of the invention or from the scope of the appended claims.

The embodiments of the invention in which an exclusive property or privilege is claimed are defined as follows:

1. A defective filter indicator comprising, a housing means defining an inlet passage for receiving pressurized fluid, said housing means defining an outlet passage, a filter casing and a filtering element defining an inlet cavity connected to said inlet passage and an outlet cavity connected to said outlet passage with said cavities separated by said filtering element, valve means defining a bypass valve normally biased to a closed position connected between the inlet passage and the outlet passage, said valve including a valve element and a valve seat forming two contacts of an electrical switch, an electrical circuit including a source of electrical energy, an alarm and said electrical switch formed by said bypass valve connected in parallel to form parallel current flow paths in said circuit, said bypass valve thereby opening in response to fluid pressure increase in the inlet passage when said filter element is defective and operating as said switch to change the circuit current flow in said circuit and to actuate said alarm indicating a defective condition of the filtering element.

2. A defective filter indicator as set forth in claim 1 wherein said electrical circuit includes an ignition switch to control energization of the circuit.

3. A defective filter indicator as set forth in claim 1 wherein said electrical circuit includes a resistor connected in series with the parallel connection of said bypass valve switch and said alarm whereby said bypass valve in the normally closed position shunts current around said alarm and the current generates a voltage drop across said alarm when said bypass valve is opened to thereby indicate a defective condition of the filter.

4. A defective filter indicator as set forth in claim 1 wherein said alarm includes means providing an audible signal to indicate a defective condition of the filter.

5. A defective filter indicator as set forth in claim 1 wherein the electrical circuit includes a test switch in series with said bypass valve switch to momentarily test the operativeness of the alarm.

6. A defective filter indicator as set forth in claim 1 wherein said alarm includes a light bulb to indicate the defective condition of the filter element.

* * * * *